2,803,165

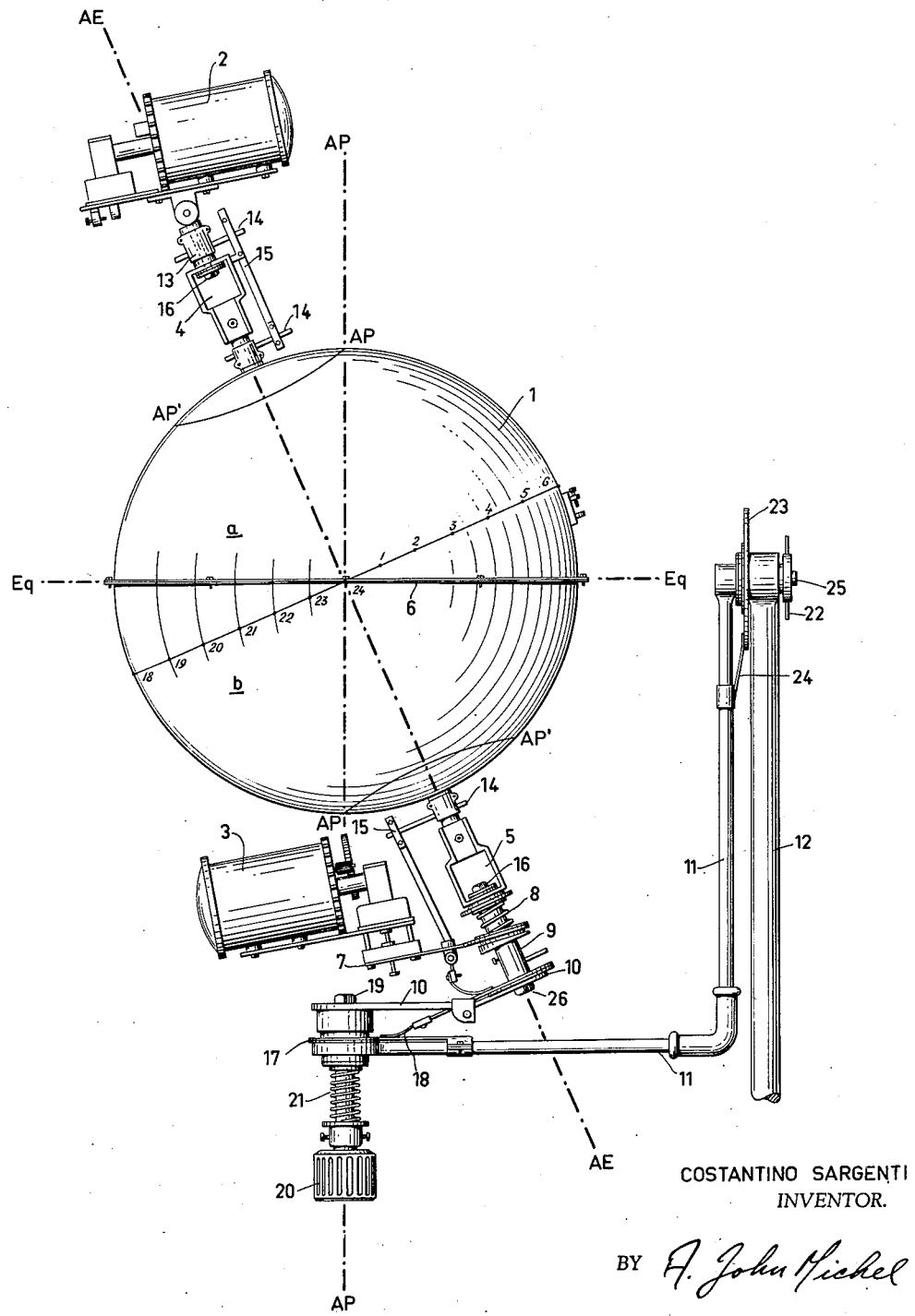

PLANETARIUM PROJECTING APPARATUS

Costantino Sargenti, Rome, Italy

Application November 1, 1955, Serial No. 544,334

Claims priority, application Italy November 13, 1954

5 Claims. (Cl. 88—24)

A planetarium is a machine adapted to exhibit by animated projection on a concave hemispherical screen the movements of the stars, the sun, the moon and the planets in the sky.

However, these mechanisms require expensive plants and considerable space to obtain such an exhibition as to be adequate for the purpose for which they are built and which is desired to be achieved therewith.

The object of the present invention is to be provide a planetarium having reduced proportions and which is easy to be operated, which is constructed for teaching purposes in order to exhibit by projection the canopy of sky, and it is chiefly intended to popularize astronomy.

The invention is illustrated by way of example only, without any limitation, in the annexed single figure of the drawing.

Referring to the drawing, the apparatus reproducing the movements of the sun, the moon and the stars at every hour, day, month and year, is composed of a central sphere 1 which is formed from two spherical shells $a$–$b$, the axis of the ecliptic AE and the polar axis AP. The sum projector 2 is arranged upon shell $a$ of the sphere by means of support 4 which is coaxial with the ecliptic. The moon projector 3 is similarly connected to shell $b$ by means of support 5 which is also coaxial with the axis of the the ecliptic.

On spherical shell $a$ the northern constellations and on spherical shell $b$ the southern constellations are depicted. Moreover, the ecliptic, the hours for the straight ascensions 18–24 and 1–6 and the orbits of precession of the celestial poles AP—AP' are illustrated on the sphere. The spherical shells $a$ and $b$, which are connected to the joints 6 by means of screws, are provided with a number of holes permitting the passage of the projection light for the stars, which light is furnished by a small point light lamp located in the centre of sphere 1.

The projector of the sun, arranged on the axis of ecliptic AE and rotating around this axis, is a conventional magic lantern reproducing the disk of the sun. The projector 3 of the moon is likewise a magic lantern adapted to reproduce the lunar disk; it is connected to axis AE and capable of rotating around the same. The connection of this projector 3 to the axis of the ecliptic is obtained by means of a plate 7 on which a pressure is exerted by a spiral spring 8, so as to cause plate 7 and, consequently, projector 3, when rotating, to follow the inclination of the plane of the lunar orbit, situated below, which is represented by a disk welded to cylinder 9 capable of being rotated. Said spiral spring and cylinder are arranged at the end of the axis of ecliptic which is fixedly connected at 26 with supporting plate 10 which, in its turn, is fixed to the end of polar axis AP at this axis 19 is rotatably mounted in the head of tube 11, the rotary motion being slowed by spiral spring 21. Tube 11 is carried by supporting shaft 12 which forms the base.

Piece 4, for connecting projector 2 to sphere 1, at the top is provided with a hole, within which rotates axis 13 made integral with projector 2; moreover, at the bottom it is firmly connected to the sphere.

According to a feature of the invention, the projector of the sun may be easily mounted and removed, whereas there is no need for the projector of the moon to be moved, even when the sphere is being turned upside down. Connecting piece 4 as well as connecting piece 5 are provided with the springs 14 and 15 for the transmission of the electric current. Connecting piece 5 for sphere 1 is not stationary, but it can rotate upon itself and, in order to be able to control the rotary motion, a nut 16 is slightly screwed in. Said rotary motion of sphere 1, which is joined to connecting piece 5, takes place around axis AE.

The two connecting pieces 4 and 5 give also the possibility of turning upside down sphere 1, so as to permit the free projection of the southern sky. On the horizontal end of tube 11, which is bent at right angle and on which rests supporting plate 10, a dial-plate 17 having 24 divisions, corresponding to the hours of the day, as well as a small spring 18, exerting pressure on the dial-plate, are provided, both the dial-plate and the spring serving the purpose of indicating, during the rotation of the apparatus, the period of time required by the constellations to perform their apparent movements, and to give at the same time knowledge of the period of time that has elapsed from the rise to the set of the sun, the moon and the constellations as well as the hour of their rising and setting. Below the horizontal arm of support 11, axis AP, which at its upper end is made integral with supporting plate 10, is provided with a spiral spring 21 and a knob 20, which latter permits to impart to the whole apparatus a rotary motion around the polar axis AP.

Lastly, in order to permit the apparatus according to the invention to take up inclinations and even to rotate about axis Eq, to show the appearance of the celestial sphere depending upon the movements of the observer on the earth, the upper vertical end of supporting tube 11 for the planetarium moves in its seat of connection to supporting shaft 12, where pin 25 is locked by a thumb nut 22. Lastly, a goniometer 23 applied to shaft 12 permits to adjust the inclination of the apparatus with respect to the degree of terrestrial latitude, from which the projection is desired to be reproduced, and by means of the reading as indicated by pointer 24.

For the working of the apparatus it is to be borne in mind that the sphere has to maintain its centre in the centre of the cupola, preferably of white cloth, which performs the function of a screen. The sphere will rotate around the axis of ecliptic AE by imparting the rotary motion to connecting piece 5, when it is desired to show the transmigration of the celestial poles, it will, instead, rotate around the polar axis AP together with the projector, by imparting the rotary motion to knob 20, when it is wanted to show the apparent movement of the celestial sphere depending upon the revolution in day-time of our planet.

The apparatus as disclosed hereinbefore, according to one of its particular features, reproduces the eclipses of the sun, the moon as well as the phases of the moon itself. Its working has been disclosed above by explaining the functions of the members composing the planetarium.

The use of a planetarium as illustrated and disclosed permits to obtain several advantages; but it will be sufficient to consider the moderate cost involved with its construction and the ease of permitting to generalize the use of this instrument particularly suitable for teaching purposes, as well as the exactness in its performances, so that it will be welcome to people and to institutes who may be interested therein.

What I claim is:

1. A projection apparatus for a planetarium, comprising a hollow spherical body consisting of two hemispherical shells, one shell being perforated to depict the northern constellations and the other shell being perforated to depict the southern constellations, the spherical body also depicting the orbits of the celestial poles, the ecliptic and the straight ascensions; a light source mounted in the hollow spherical body for projecting light through the perforated shells; a projector of the sun; a projector of the moon; supports for said projectors; means for interchangeably mounting said supports on a respective one of said shells coaxially with the ecliptic; a base support for the spherical body; a support arm mounted on said base support; a rotatable axle mounted in said support arm, said axle defining the polar axis of the spherical body; a support plate fixedly connected to one end of said rotatable axle and to one of said supports, said one support being mounted for rotation about the ecliptic; a dial plate having 24 divisions indicating the hours of the day fixedly mounted on the support arm and an indicator fixedly mounted on the support plate, said indicator cooperating with the dial plate to indicate the hour relative to the appearance of the sky during rotation of the spherical body about said rotatable axis.

2. The projection apparatus of claim 1, comprising a knob mounted on the other end of said rotatable axle for rotating the axle and a spiral spring around said axle for controlling the rotary motion.

3. The projection apparatus of claim 1, comprising an extension integrally connected to said support arm at right angle thereto and means for rotatably mounting said extension on the base support.

4. The projection apparatus of claim 3, comprising a goniometer mounted for cooperation with said means for rotatably mounting the support arm extension whereby the support arm and the spherical body mounted thereon may be rotated into a predetermined position about the equatorial axis of the spherical body.

5. The projection apparatus of claim 1, comprising means for supporting the projector of the moon rotatably on said one support, said means being inclined in respect to the ecliptic to produce the movable orbit of the moon upon rotation.

References Cited in the file of this patent

UNITED STATES PATENTS

| 1,616,736 | Bauersfeld | Feb. 8, 1927 |
| 1,693,969 | Villiger et al. | Dec. 4, 1928 |
| 2,168,799 | Korkosz et al. | Aug. 8, 1939 |
| 2,178,352 | Unglaube et al. | Oct. 31, 1939 |
| 2,393,310 | Crane | Jan. 22, 1946 |
| 2,632,359 | Spitz | Mar. 24, 1953 |